United States Patent Office 3,438,222
Patented Apr. 15, 1969

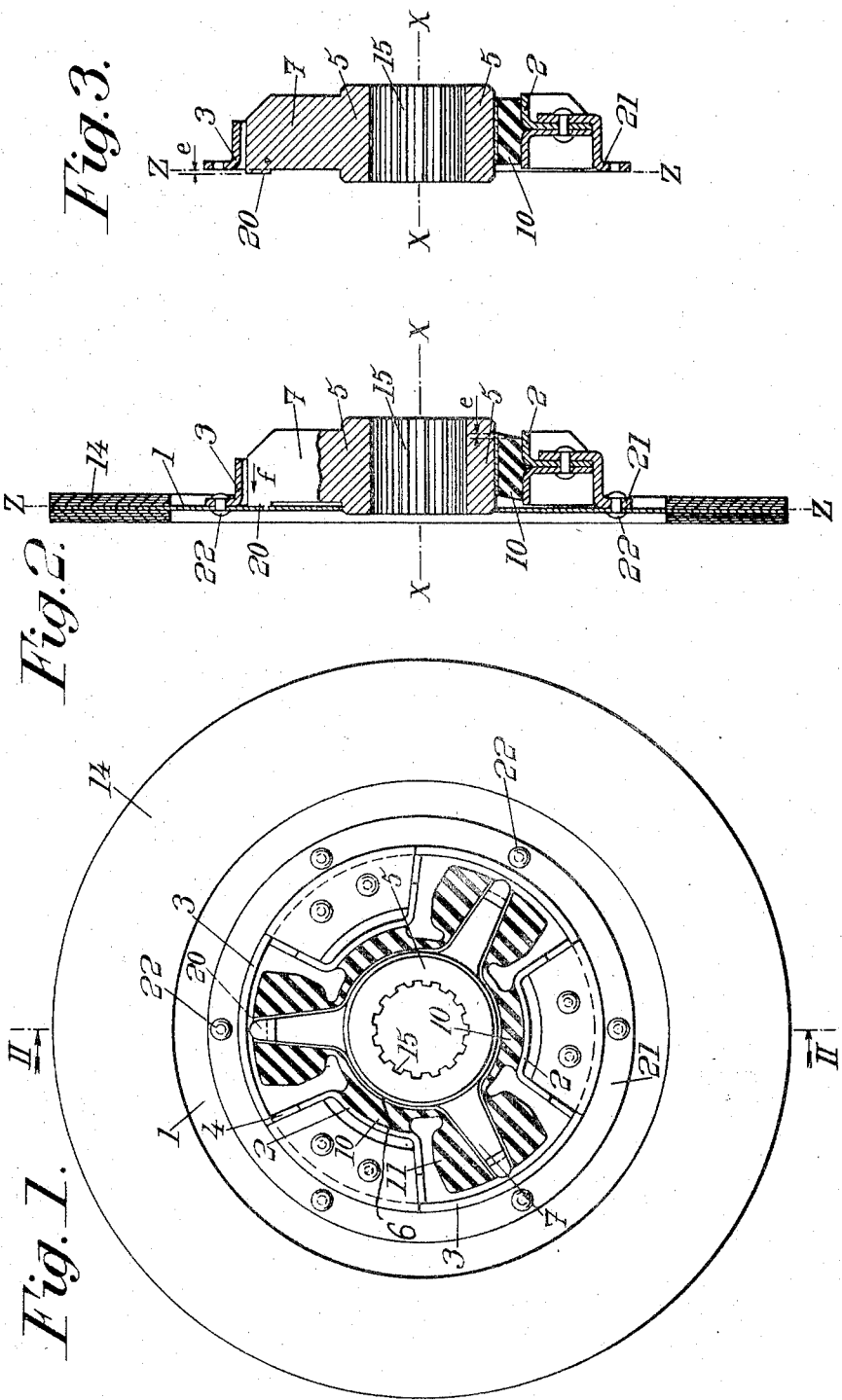

3,438,222
RESILIENT COUPLINGS, IN PARTICULAR FOR USE IN AUTOMOBILE VEHICLES
Jean Felix Paulsen, Chateaudun, France, assignor to Luxembourgeoise de Brevets et de Participations, a society of the Duchy of Luxembourg
Filed Mar. 30, 1967, Ser. No. 627,075
Claims priority, application France, Apr. 6, 1966, 56,708
Int. Cl. F16d 3/14
U.S. Cl. 64—27   3 Claims

ABSTRACT OF THE DISCLOSURE

Two rotary elements, one of which carries a clutch disc, are coupled together by two sets of resilient blocks. The rotary element which does not carry the clutch disc, carries a plurality of rigid abutments which are permanently urged axially against one of the faces of the clutch disc—preferably by means of the blocks of one set, which are axially prestressed for this purpose—to keep the respective axes of these two elements constantly in line with each other.

---

The present invention is concerned with improvements in resilient couplings, more especially for use in the clutches of automobile vehicles.

A coupling of this kind essentially comprises a first rigid element carried by one shaft and connected through elastomer resilient means working partly in shearing fashion with a second element forming a clutch disc and provided with surfaces forming abutments with respect to arms of the first element.

The essential feature of the present invention consists in providing means for causing the clutch element to remain perfectly flat and perpendicular to the axis of the other element, such means consisting in particular in abutments carried by the first rotary element and resiliently applied against the flat disc of the second rotary element so that this disc is always in correct position.

A preferred embodiment of the present invention will be hereinafter described with reference to the appended drawings, given merely by way of example, and in which:

FIG. 1 is a front view of an embodiment of a coupling device made according to the present invention;

FIG. 2 is a section on the line II—II of FIG. 1; and

FIG. 3 separately shows one of the elements of this coupling device.

The coupling device as illustrated by FIGS. 1 and 2 comprises the following parts: a hub 5, provided with longitudinal inner grooves 15 for transmitting the drive of a primary shaft to said hub 5, which includes cylindrical portions 6 and radial arms 7; a clutch disc 1 rigid with a cage including cylindrical portions 2 coaxial with hub 5 and at a distance therefrom, cylindrical portions 3 also coaxial with hub 5 but of greater radius, and radial portions 4 connecting said cylindrical portions 2 with said cylindrical portions 3, and resilient means including, on the one hand, elastomer blocks 10 transmitting shearing and twisting stresses from hub 5 to cylindrical portions 2, and, on the other hand, elastomer blocks 11 carried by the radial arms 7 and adapted to come into contact with radial portion 4 of the cage.

In a device of this kind, the plane of disc 1 may come into positions where it is not exactly perpendicular to the axis of hub 5. This is due to the presence of rubber blocks between hub 5 and cage 2–3–4. As a matter of fact, the unavoidable defects due to molding of these rubber blocks and to the cooling thereof may cause disc 1 to be not exactly perpendicular to the axis of hub 5.

In order to obviate this drawback, according to the present invention as illustrated by the appended drawings, the ends of arms 7 are provided with projections 20 forming abutments adapted to bear against disc 1.

The faces of these projections 20 are machined so as to be located exactly in the same plane and advantageously they are provided with means for reducing to a minimum the friction between said surfaces and disc 1. In order to apply these projections 20 against disc 1 it suffices, as shown by FIG. 3, that, before assembly, the bearing faces of projections 20 are located a small distance $e$ beyond the plane ZZ of assembly of the hub with respect to its cage.

This plane of assembly is determined, for instance, by an annular flange 21 rigid with cage 2–3–4 and with the hub and secured to disc 1 through rivets 22.

Comparison between FIGS. 2 and 3 shows that, when the whole of hub 5 and its cage is applied against disc 1, this can be done only by producing an axial deformation of amplitude $e$ (FIG. 2) of rubber blocks 10, this amplitude being equal to the height of projections 20 (FIG. 3).

It follows that disc 1 remains in permanent contact with projections 20 along plane ZZ and consequently is kept exactly perpendicular to the hub axis XX.

In a general manner, while the above description discloses what is deemed to be a practical and efficient embodiment of the present invention, said invention is not limited thereto as there might be changes made in the arrangement, disposition and form of the parts without departing from the principle of the invention as comprehended within the scope of the appended claims.

What I claim is:

1. An improved resilient coupling which comprises:
   a first rigid rotary element icnluding circumferential portions and radial portions,
   a second rigid rotary element including circumferential portions and radial portions,
   the respective axes of said rotary elements being in line with each other and said first rotary element having a flat face located in a plane perpendicular to said axes,
   elastomer resilient blocks interposed between the respective circumferential portions of said two rotary elements, and elastomer blocks being adhered to said two rotary elements to transmit torque from one to the other by shearing and twisting deformation of said blocks, and
   elastomer resilient blocks carried by the radial portions of one of said rotary elements and at a distance from the radial portions of the other of said rotary elements so as to come into abutting contact therewith for a limited relative rotation of said rotary elements with respect to each other, for transmitting torques from one to the other,
   wherein the improvement consists in
      a plurality of rigid abutments carried by said second rotary element adapted to fit against the flat face of said first rotary element to keep the respective axes of said rotary elements constantly in line with each other, said rigid abutments being permanently urged against said flat face.

2. A resilient coupling according to claim 1 wherein said abutments are resiliently urged against the flat face of said first rotary element.

3. A resilient coupling according to claim 2 wherein said first mentioned resilient blocks are prestressed in the axial direction so as resiliently to apply said rigid abutments against the flat face of said first rotary element.

References Cited

UNITED STATES PATENTS

| 3,023,593 | 3/1962 | Nallinger | 64—27 |
| 3,232,077 | 2/1966 | Binder | 64—27 |
| 3,245,229 | 4/1966 | Fadler | 64—27 |

HALL C. COE, *Primary Examiner.*